United States Patent [19]

Ishihara

[11] Patent Number: 5,640,935

[45] Date of Patent: Jun. 24, 1997

[54] TORQUE VARIATION RESTRAINING DEVICE OF AN ENGINE ACCESSORY DRIVING SYSTEM

[75] Inventor: Akira Ishihara, Oyama, Japan

[73] Assignee: Komatsu Ltd., Tokyo, Japan

[21] Appl. No.: 564,097

[22] PCT Filed: Jun. 8, 1994

[86] PCT No.: PCT/JP94/00922

§ 371 Date: Dec. 11, 1995

§ 102(e) Date: Dec. 11, 1995

[87] PCT Pub. No.: WO94/29581

PCT Pub. Date: Dec. 22, 1994

[30] Foreign Application Priority Data

Jun. 11, 1993 [JP] Japan ................... 5-166179

[51] Int. Cl.$^6$ ........................................... F02B 75/06
[52] U.S. Cl. .................. 123/192.1; 188/381; 464/180
[58] Field of Search ..................... 123/192.1; 188/381; 464/180, 181

[56] References Cited

FOREIGN PATENT DOCUMENTS

| | | |
|---|---|---|
| 61-122344 | 8/1986 | Japan . |
| 1-180021 | 12/1989 | Japan . |
| 4-101023 | 4/1992 | Japan . |
| 5-113130 | 5/1993 | Japan . |

*Primary Examiner*—Noah P. Kamen
*Attorney, Agent, or Firm*—Sidley & Austin

[57] ABSTRACT

The present invention is concerned with a torque variation restraining device of an engine accessory driving system. It is possible to reduce the gear grating noise of the engine gear system and reduce a load on the gear tooth surfaces by restraining torque and/or rotation variations of the driving shaft and the gear system, which variations are generated as the driven torque of the engine accessory varies sharply. For this purpose, a compartment is provided between a retainer housing (4) and the driving shaft (1) of the engine accessory, a friction damper (6) which surrounds the outer periphery of the driving shaft (1) is disposed in this compartment, and an oil supply means (10) introduces engine lubricating oil between the friction damper (6) and the retainer housing (4). The friction damper (6) is brought into contact with the driving shaft (1) by a lubricating oil pressure, and the frictional braking force to the driving shaft (1) resulting from this contact increases as the lubricating oil pressure increases with an increase in the engine rotation speed.

20 Claims, 5 Drawing Sheets

TORQUE VARIATION RESTRAINING DEVICE OF AN ENGINE ACCESSORY DRIVING SYSTEM

TECHNICAL FIELD

The present invention relates to a torque variation and/or rotation variation restraining device of an engine accessory driving system, which torque variation and/or rotation variation are caused to be generated as the driven torque from the engine varies.

BACKGROUND ART

Hitherto, various accessory machines mounted on an engine have been driven by various methods. When a gear driving system is used, timing gears for transmitting the driving torque of the crank shaft to the cam shaft, a fuel injection pump, and the like, are disposed and housed in a timing gear case of the engine in a state in which the timing gears are meshed with each other. Most construction machines, and large vehicles, such as buses or trucks, have a diesel engine mounted therein which generates a large torque and whose fuel cost is economical. The diesel engine for these vehicles is provided with a driven engine accessory, e.g., a driven fuel injection pump. In one type, a fuel injection pump is mounted in a cylinder block of an engine or on the side of a crank case, and the fuel injection pump is driven by a fuel injection pump driving gear located inside a timing gear case. In another type of driven fuel injection pump, the fuel injection pump is directly mounted on the external surface of a timing gear case, and is driven by the fuel injection pump driving gear. From among types in which the former fuel injection pump is mounted in the cylinder block or on the side of the crank case, as means for restraining variations in a driving torque, there is a type in which a weight having a large rotational inertia is disposed in the middle of the driving shaft. A damper formed of an inertia ring member and an elastic member is added to a coupling of the fuel injection pump driving shaft and a fuel injection pump shaft, thereby reducing torsion vibrations which are generated in the driving shaft system (refer to, for example, Japanese Utility Model Laid-Open No. 1-180021).

However, in order to cope with recent exhaust emission regulations, there is a tendency for the fuel injection pressure of the diesel engine to be higher. Therefore, since the driven torque of the fuel injection pump increases, problems are assumed to arise, for example, the gear grating noise between the driving gears which mesh with each other increases, the tooth surfaces are damaged, or the driving shaft system may malfunction, for example, the coupling and the driving shaft may be broken. FIGS. 8a to 8h show an example for comparing an engine having mounted thereon a fuel injection pump, which is set at a normal fuel injection pressure, with an engine having a fuel injection pump whose fuel injection pressure is set at a high pressure, regarding changes in various characteristics as the fuel injection pressure becomes higher. As a result of the fuel injection pump becoming higher in pressure, the pressure of the fuel injection pipe increases (see FIGS. 8a and 8b). The variation waveform of the driving torque of the fuel injection pump becomes steep in proportion to the pressure waveform of the fuel injection pipe, and its absolute value increases (see FIGS. 8c and 8d). In response to this increase, the rotation variation of the driving gear of the fuel injection pump becomes greater (see FIGS. 8e and 8f). Further, the impact force between the tooth surfaces between the driving gear of the fuel injection pump and the idle gear, which meshes with the driving gear, increases and the surface vibrations of the gear case and the surface vibrations of the cylinder block increase (see FIGS. 8g and 8h). Also, the increase in the variation in the driving torque can cause an excessive stress to occur in the driving shaft, causing problems, for example, the driving system may be damaged or broken. Therefore, in some cases, it is necessary to relax the driven torque which varies sharply, including the driving torque.

SUMMARY OF THE INVENTION

The present invention has been achieved to solve the above-described problems of the prior art. It is an object of the present invention to provide a torque variation restraining device of an engine accessory driving system capable of restraining torque and/or rotation variations of the driving shaft and the gear system, which variations are generated in response to sharp variations in the driven torque of various engine accessories, e.g., the above described fuel injection pump, and capable of reducing the gear grating noise of the tooth system of the engine, improving the durability of the gear due to a reduction in the load on the tooth surfaces, and improving the reliability of the gear driving shaft system.

To achieve the above-described object, in the torque variation restraining device of the engine accessory driving system in accordance with the present invention, a compartment which surrounds a part of the driving shaft of the engine accessory is provided between a retainer housing and the driving shaft of the engine accessory, a friction damper is disposed in this compartment in such a manner as to surround the outer periphery of the driving shaft of the engine accessory, oil supply means is provided for introducing engine lubricating oil between the outer surface of the friction damper and the retainer housing, the engine lubricating oil pressure is made to act via the oil supply means so that the inner surface of the friction damper is brought into contact with the driving shaft of the engine accessory, and the frictional braking force to the driving shaft of the engine accessory resulting from this contact increases as the engine lubricating oil pressure increases with an increase in the engine rotation speed. The friction damper comprises a plate spring, which is nearly semicircular in the side shape, and a friction rubber member which covers the central portion of the plate spring along the direction of the length thereof. In the edge of the friction rubber member, lips are formed which come into contact with the walls at both ends of the compartment along the axial direction and the inner peripheral surface of the retainer housing. As a result, a pressure chamber is formed by the above and the retainer housing, and a plurality of projections are formed on a side opposite to the driving shaft of the engine accessory. These projections are brought into contact with the outer peripheral surface of the driving shaft of the engine accessory when the engine lubricating oil pressure from the oil supply means is made to act on the pressure chamber. Cutout grooves, such that both ends of the plate spring are able to slide along the direction of the length thereof as desired, are provided in the compartment. In this plate spring, when the friction rubber member is almost worn out, both ends of the plate spring come into contact with the bottom surface of the cutout groove, and a predetermined gap is provided between the driving shaft of the engine accessory and the plate spring.

With such construction, when the driving shaft of the engine accessory is rotated, a frictional force due to the engine lubricating oil pressure is generated in the contact portion between the driving shaft of the engine accessory and the friction damper. Since this frictional force becomes a braking force and restrains variations in torque and rotation which occur in the driving shaft of the engine accessory and the driving means mounted in the driving shaft, the gear grating noise of the engine gear system and the load on the gear tooth surfaces are reduced. The engine lubricating oil pressure increases, due to an increase in the engine rotation speed, and, in response to this increase, the contact pressure and the contact area of the friction damper with the outer periphery of the driving shaft of the engine accessory increase, thereby increasing the frictional force. Therefore, it becomes possible to make a braking force corresponding to the engine rotation speed act on the driving shaft of the engine accessory.

Since the friction damper is composed of a plate spring and a friction rubber member, and a pressure chamber is formed by the lips of the friction rubber member, the retainer housing, and the like, by applying an engine lubricating oil pressure to this pressure chamber, it becomes possible to make the friction rubber member come into contact with the outer peripheral surface of the driving shaft of the engine accessory. As the engine lubricating oil pressure increases, a plurality of projections provided on the friction rubber member contact the outer peripheral surface in sequence, and the contact area of the friction damper with the outer periphery of the driving shaft can be increased. This friction rubber member makes a braking force in proportion to the engine rotation speed act on the driving shaft of the engine accessory as a result of the contact of the friction rubber member with the outer peripheral surface of the driving shaft of the engine accessory, and wears gradually because of the repeated contact. However, in the present invention, since both ends of the plate spring come into contact with the bottom surface of a cutout groove when the friction rubber member is almost worn out, further wearing of the friction rubber member is substantially stopped. Since there is a gap between the plate spring and the driving shaft of the engine accessory in a state in which the wear of the friction rubber member is stopped, no contact will occur between the plate spring and the driving shaft of the engine accessory, and it is possible to prevent the driving shaft of the engine accessory from being damaged.

BRIEF DESCRIPTION OF THE DRAWINGS

FIG. 8a is a graph illustrating the pressure of the fuel injection pipe at a normal injection pressure;

FIG. 8b is a graph illustrating the pressure of the fuel injection pipe at a high injection pressure;

FIG. 8c is a graph illustrating the driving torque of the fuel injection pump at a normal injection pressure;

FIG. 8d is a graph illustrating the driving torque of the fuel injection pump at a high injection pressure;

FIG. 8e is a graph illustrating the rotation displacement of the driving gear of the fuel injection pump at a normal injection pressure;

FIG. 8f is a graph illustrating the rotation displacement of the driving gear of the fuel injection pump at a high injection pressure;

FIG. 8g is a graph illustrating surface vibrations of a timing gear case at a normal injection pressure; and FIG. 8h is a graph illustrating surface vibrations of a timing gear case at a high injection pressure.

THE BEST MODE FOR CARRYING OUT THE INVENTION

A preferred embodiment of a torque variation restraining device of an engine accessory driving system in accordance with the present invention will be described below with reference to the accompanying drawings.

Figure 1:
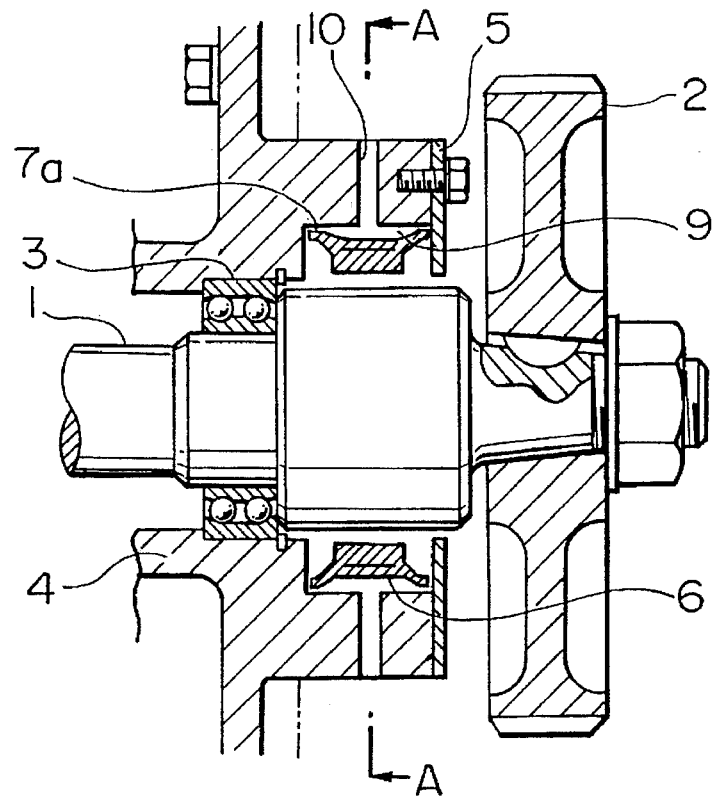
FIG. 1 is a sectional view of the essential portion of a driving shaft of a fuel injection pump and the vicinity thereof in accordance with the present invention, in a state in which the engine is stopped.
Figure 2:
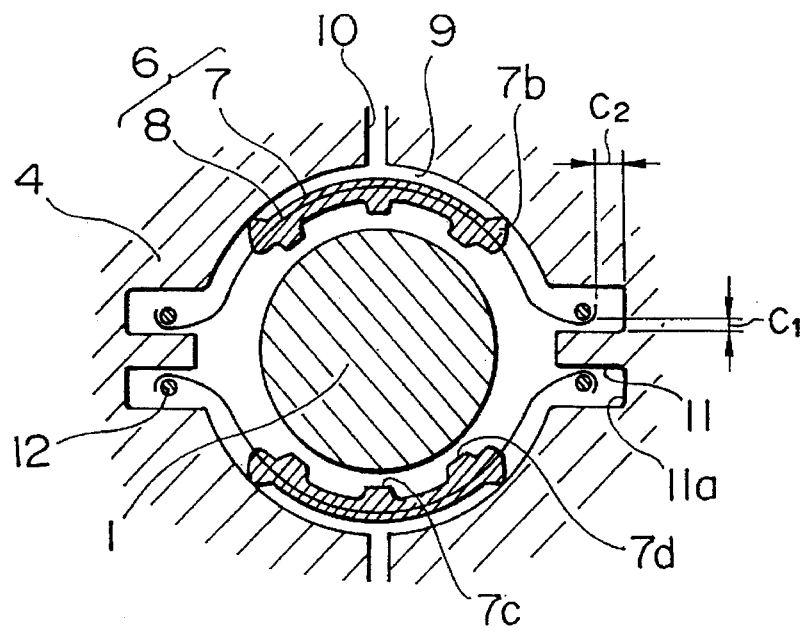
FIG. 2 is a sectional view taken along the line A—A of FIG. 1, and shows the essential portion of the interior of a retainer housing.

In this embodiment, a fuel injection pump is used as an example of an engine accessory. Referring to FIGS. 1 and 2, reference numeral 1 denotes a fuel injection pump driving shaft, which is the driving shaft of the engine accessory; reference numeral 2 denotes a fuel injection pump driving gear, which is the driving means of the engine accessory; reference numeral 3 denotes a bearing; and reference numeral 4 denotes a retainer housing; the fuel injection pump driving shaft 1 being supported by the retainer housing 4 via the bearing 3. As a result of the mounting of a plate 5 on the end surface of the fuel injection pump driving gear 2 side of the retainer housing 4, a compartment is formed so as to surround a part of the fuel injection pump driving shaft 1. Two friction dampers 6 are disposed in this compartment at opposed positions so as to surround the outer periphery of the fuel injection pump driving shaft 1.

The friction damper 6 is formed of a friction rubber member 7, whose side shape is substantially arcuate, and a plate spring 8, whose side shape is substantially semicircular. The friction rubber member 7 covers the central portion of the plate spring 8 along the direction of the length thereof by means of a bonding agent, such as an adhesive. Lips 7a and 7b are provided at the edges of the friction rubber member 7, and the lip 7a is in contact with the inner surface of the plate 5 and the inner wall of the retainer housing 4 facing the plate 5. The lip 7b is in contact with the inner peripheral surface of the retainer housing 4, and a pressure chamber 9 is formed which is surrounded by the friction rubber member 7, the lips 7a and 7b, and the retainer housing 4. An oil supply hole 10, serving as oil supply means, is provided in the pressure chamber 9, which hole opens to the outside of the retainer housing 4. Projections 7c and 7d, parallel to the axis of the fuel injection pump driving shaft 1, are provided in the central portion and both ends, respectively, on the inner surface of the friction rubber member 7.

A total of four cutout grooves 11 by which both ends of the plate springs 8 can slide are provided in the retainer housing 4 in the compartment which surrounds a part of the fuel injection pump driving shaft 1. Pins 12 are disposed parallel to the axis center of the fuel injection pump driving shaft 1, in the respective cutout grooves 11, and are fixed to the retainer housing 4. Each terminal portion of a plate spring 8 is mounted in such a manner as to be inserted in a gap C1 between a pin 12 and a cutout groove 11. Therefore, when a plate spring 8 is shrunk, the plate spring 8 slides inside the gap C1 while the plate spring 8 contacts the side surface of the cutout groove 11. Also, a gap C2 is provided between the terminal portion of the plate spring 8 and the bottom surface 11a of the cutout groove 11. The projections 7c and 7d, to be described later, have a large influence upon the braking performance of the friction damper. In this embodiment, the projections 7c and 7d have the projection shape shown in FIG. 2. This shape can be determined as necessary so that the braking force becomes optimum, and the number thereof is not limited to three.

With such construction, FIGS. 1 and 2 show a state in which the engine is stopped. Since the pressure of the lubricating oil applied to the pressure chamber 9 from the oil supply hole 10 of the retainer housing 4 is zero, the pressure of the pressure chamber 9 is zero, that is, nearly the same as outside the pressure chamber 9. Therefore, since there is no compressive force applied to the friction damper 6, the lips 7a and 7b of the friction rubber member 7 are in contact with the inner wall of the retainer housing 4 and the plate 5, and the inner peripheral surface of the retainer housing 4, respectively. In this state, neither of the projections 7c and 7d inside the friction rubber member 7 is in contact with the fuel injection pump driving shaft 1.

Figure 3:
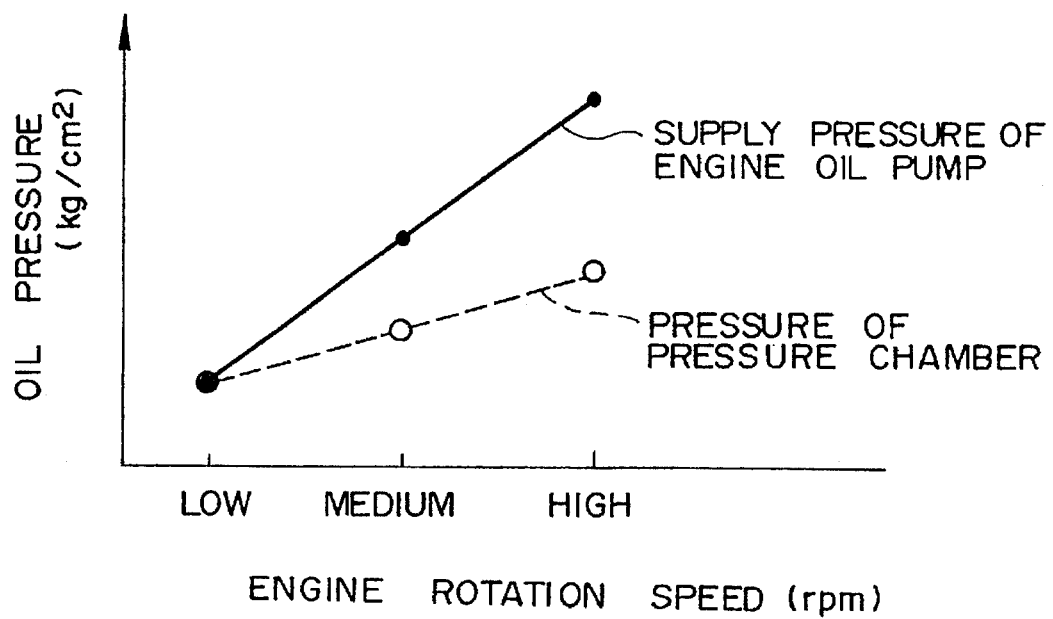
FIG. 3 is a graph illustrating the relationship between the engine rotation speed, the engine oil pump, and the oil pressure of a pressure chamber.
Figure 4:
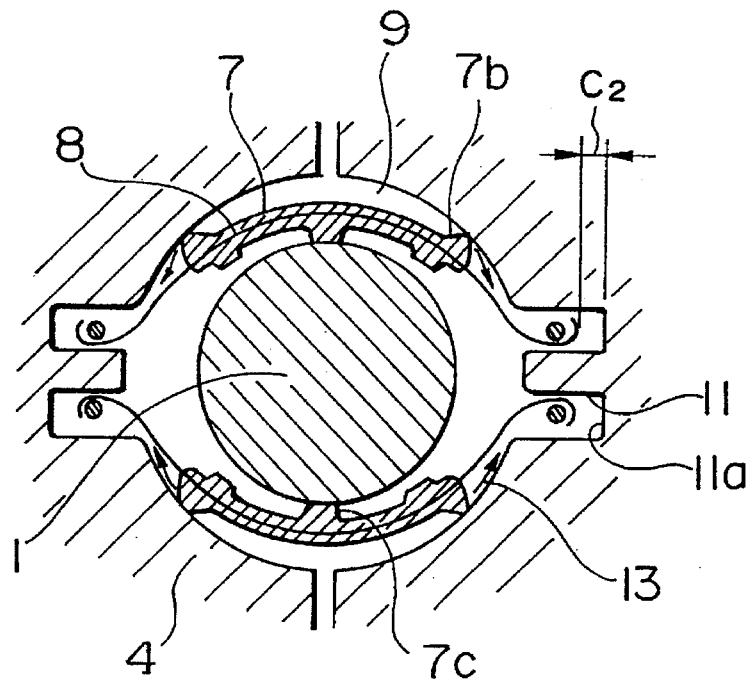
FIG. 4 is a sectional view of the essential portion of the interior of the retainer housing in accordance with the present invention, in a state in which the number of rotations of the engine is low or medium.

Next, when the engine is started, an oil pressure occurs in the pressure chamber 9 due to the lubricating oil supplied from the oil pump (not shown). The pressure, as shown in FIG. 3, increases roughly in proportion to an increase in the engine rotation speed. The toughness of the plate spring 8 is set so that when the engine rotation speed reaches a low or medium region, the friction rubber member 7 is shaped as that shown in FIG. 4. That is, by the lubricating oil pressure acting upon the pressure chamber 9, the plate spring 8 flexes toward the fuel injection pump driving shaft 1 side, and the central projection 7c, from among projections provided inside the friction rubber member 7, is brought into contact with the fuel injection pump driving shaft 1. At this time, a friction results from the contact of the projection 7c with the fuel injection pump driving shaft 1. As a result, a braking force acts on the torque variations and/or rotation variations. Since the lip 7b of the friction rubber member 7, which serves to hold the pressure of the pressure chamber 9, decreases in the pressing pressure toward the inner peripheral surface of the retainer housing 4 when the pressure of the pressure chamber 9 increases as the engine rotation speed increases, the lubricating oil begins to leak past the lip 7b into contact with the fuel injection pump driving shaft 1 in the direction indicated by the arrow 13 in FIG. 4. Therefore, the difference between the pressure of the pressure chamber 9 and the oil pump supply pressure becomes greater as the engine rotation speed increases (see FIG. 3). The lubricating oil which leaks past the lip 7b is used to lubricate and cool the contact portion between the fuel injection pump driving shaft 1 and the friction rubber member 7. The gap C2 between the terminal portion of the plate spring 8 and the bottom surface 11a of the cutout groove 11 is smaller than when the engine is stopped, but does not reach zero.

Figure 5:
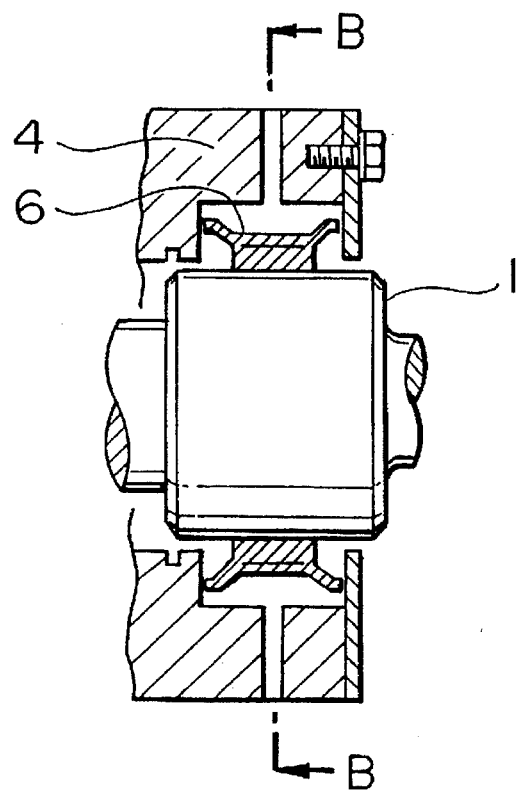
FIG. 5 is a partial, sectional view of the driving shaft of the fuel injection pump and the vicinity thereof in accordance with the present invention, in a state in which the number of rotations of the engine is high.
Figure 6:
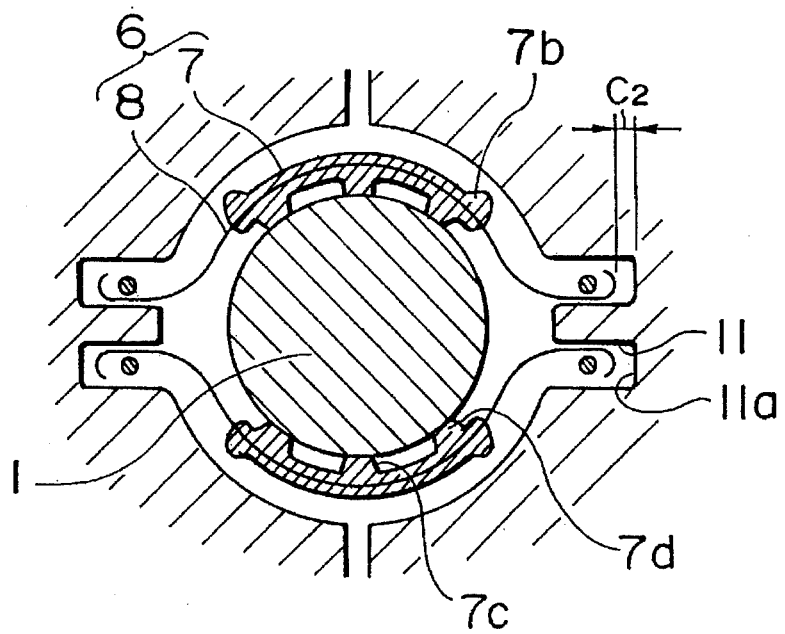
FIG. 6 is a sectional view taken along the line B—B of FIG. 5.

FIGS. 5 and 6 show the state of the friction damper 6 when the engine rotation speed is high. As the lubricating oil pressure increases, the plate spring 8 is further pressed against the fuel injection pump driving shaft 1 side. For this reason, the central projection 7c and the projections 7d at both ends are brought into complete contact with and pressed against the fuel injection pump driving shaft 1, and the frictional braking force increases further. Therefore, when the engine rotation speed is high, the torque and/or rotation variations of the fuel injection pump driving shaft 1 naturally become great. However, since a large braking force can be obtained as described above, it is possible to restrain these variations. Since the lip 7b of the friction rubber member 7 completely separates from the inner peripheral surface of the retainer housing 4, the amount of leakage of the lubricating oil increases, and the amount of the lubricating oil between the friction rubber member 7 and the fuel injection pump driving shaft 1 increases. The gap C2 between the terminal portion of the plate spring 8 and the bottom surface 11a of the cutout groove 11 becomes further smaller than when the engine rotation speed is medium, but is not zero.

Figure 7:
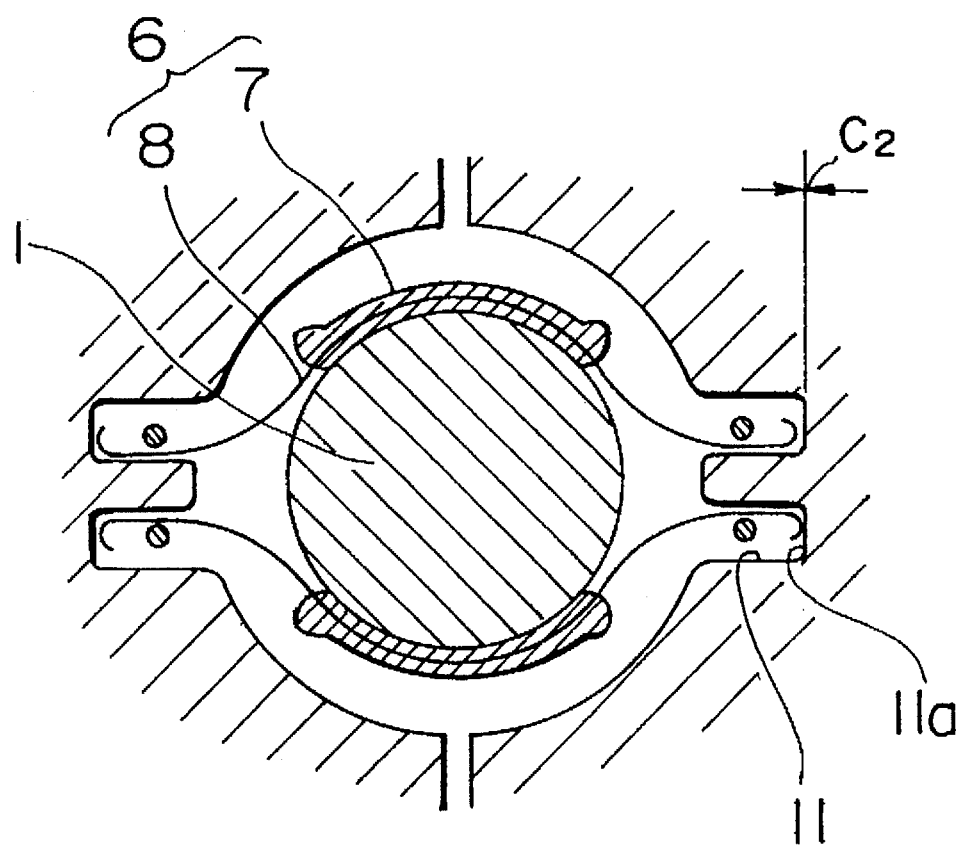
FIG. 7 is a sectional view of the essential portion of the interior of the retainer housing in accordance with the present invention, in a state in which a friction rubber member is almost worn out.
Figure 8A:
FIGS. 8a to 8h are graphs illustrating various characteristics of an engine having mounted therein a fuel injection pump, which is set at a normal injection pressure, or an engine having mounted therein a fuel injection pump, which is set at a high injection pressure, in accordance with the prior art.
Figure 8B:
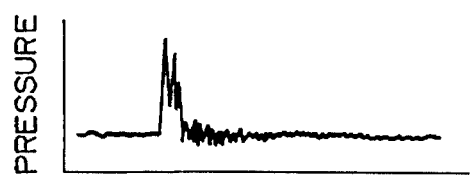
Figure 8C:
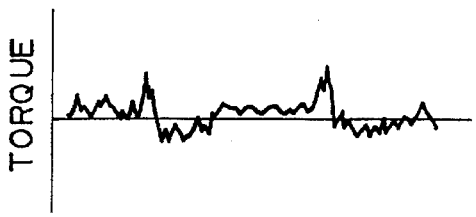
Figure 8D:
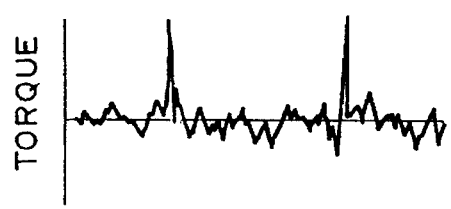
Figure 8E:
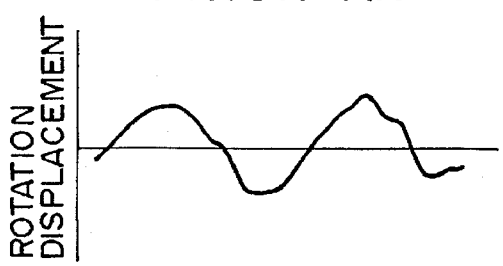
Figure 8F:
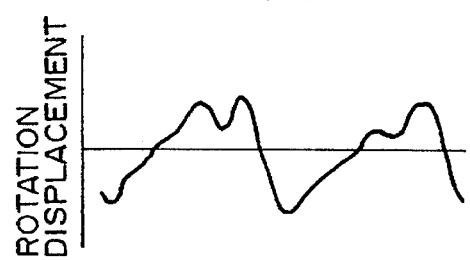
Figure 8G:
Figure 8H:
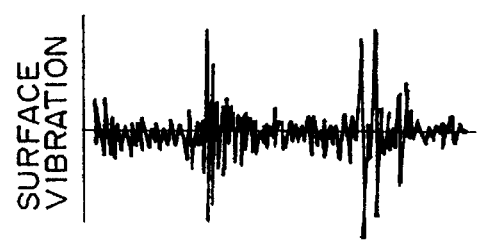

However, after long hours of operation, the portion of the friction damper 6 making sliding contact with the fuel injection pump driving shaft 1 wears and is finally worn out. The progressive speed of this wearing out differs depending upon the material, the shape or the operating state of the friction rubber member 7, but this wearing out is a problem which will eventually occur. In the above description of the embodiment, the portion of the friction rubber member 7 which slides on the fuel injection pump driving shaft 1 is lubricated to reduce the wear of the rubber member, but is not complete. Therefore, when the friction rubber member 7, bonded to the plate spring 8, is worn completely, the plate spring 8 comes into direct contact with the fuel injection pump driving shaft 1, and a breakage accident might occur. Thus, to prevent this accident, a contrivance shown in FIG. 7 is made in this embodiment. In FIG. 7, the plate spring 8 is completely flexed due to the lubricating oil pressure, and the projections 7c and 7d (see FIG. 6) inside the friction rubber member 7 are worn out substantially completely. The fuel injection pump driving shaft 1 is in contact with the friction rubber member 7. If the wear of the friction rubber member 7 progresses even further, there is a risk in that the plate spring 8 may be brought into direct contact with the fuel injection pump driving shaft 1. As a countermeasure for this contact, the characteristics of the plate spring 8 are set so that the gap C2 (see FIG. 6) between both ends of the plate spring 8 and the bottom surface 11a of the cutout groove 11 becomes zero in the state shown in FIG. 7, that is, both ends of the plate spring 8 come into contact with the bottom surface 11a. Thus, a further deformation of the plate spring 8 can be prevented. For this reason, the progress of the wearing out of the friction rubber member 7 is substantially stopped at this point in time. The direct contact between the plate spring 8 and the fuel injection pump driving shaft 1 can be prevented, and it is possible to prevent the driving shaft of the engine accessory from being damaged.

As is clear from the embodiment which has been described in detail, since the contact area and the area pressure of the friction damper with the engine accessory increases or decreases depending upon whether the lubricating oil pressure of the engine is high or low, the frictional force generated from this construction becomes a braking force corresponding to the engine rotation speed. Thus, this frictional force restrains the rotation and/or torque variations in the driving shaft and the gear system of the engine accessory, and it becomes possible to reduce the gear grating noise of the engine gear system and to reduce a load on the gear tooth surfaces. Therefore, this construction contributes greatly to improved reliability of the driving shaft system of the engine accessory and to improved durability of the gears.

Although this embodiment describes a case in which a fuel injection pump is used as an example of an engine accessory, and a variation restraining apparatus is used for the driving system of the fuel injection pump, the present invention is not limited to only such a specific construction. That is, as an engine accessory to which the present invention is applied and a driving system thereof, a rotating member which generates torque and/or rotation variations is possible, and further the present invention can be applied to any rotating member which moves in the direction of the rotational axis.

INDUSTRIAL APPLICABILITY

The present invention is useful as a torque variation restraining device of an engine accessory driving system capable of restraining torque and/or rotation variations of the driving shaft and the gear system, which variations are generated as the driven torque of various engine accessories, e.g., a fuel injection pump, varies sharply, capable of reducing the grating noise of the engine gear system, improving the durability of gears due to a reduction in a load on the gear tooth surfaces, and obtaining improved reliability of the gear driving shaft system.

I claim:

1. An engine accessory driving system comprising: a driving shaft for receiving a driving force of an engine and for driving an engine accessory, said driving shaft having an axis,
   a housing for supporting said driving shaft, said housing having an inner wall defining a compartment surrounding a part of said driving shaft, said compartment being between said inner wall of said housing and an outer periphery of said part of said driving shaft,
   at least one friction damper having an inner surface and an outer surface, each said friction damper being disposed in said compartment between said inner wall of said housing and a portion of said outer periphery of said part of said driving shaft to define a chamber between said outer surface of the friction damper and said inner wall of said housing,
   an oil supply for introducing engine lubricating oil into said chamber so that a portion of said inner surface of said friction damper contacts said driving shaft when said chamber is filled with engine lubricating oil under a predetermined pressure,
   whereby a contacting of said driving shaft by said portion of said inner surface of said friction damper applies a frictional braking force to said driving shaft, and whereby said friction braking force increases as said pressure of the engine lubricating oil in said chamber increases.

2. An engine accessory driving system in accordance with claim 1, wherein said friction damper comprises a plate spring having its length in an arcuate configuration, and a frictional rubber member covering a longitudinally central portion of said plate spring, said frictional rubber member constituting said portion of said inner surface of said friction damper.

3. An engine accessory driving system in accordance with claim 2, wherein said rubber member has lips along the edges of said rubber member which extend outwardly toward said inner wall of said housing, whereby said lips contact said inner wall of said housing to form said chamber.

4. An engine accessory driving system in accordance with claim 3, wherein said rubber member has a plurality of projections extending toward said driving shaft, wherein said lips are part of said outer surface of said friction damper, and wherein said projections are said portion of said inner surface of said friction damper.

5. An engine accessory driving system in accordance with claim 4, wherein said projections are spaced apart along the length of said friction damper, so that some of said projections come into contact with said driving shaft when said chamber is filled with engine lubricating oil at a first pressure and all of said projections come into contact with said driving shaft when said chamber is filled with engine lubricating oil at a predetermined pressure higher than said first pressure.

6. An engine accessory driving system in accordance with claim 5, wherein said friction damper comprises at least two friction dampers positioned in said compartment at opposed positions about said driving shaft so as to surround the outer periphery of said part of said driving shaft, with each of said friction dampers defining a respective chamber between said outer periphery of said part of said driving shaft and said inner wall of said housing, and wherein said oil supply is adapted to provide engine lubricating oil under pressure to each chamber.

7. An engine accessory driving system in accordance with claim 6, wherein said housing is provided with a pair of grooves for each friction damper, each of said grooves having a bottom surface, wherein each plate spring has first and second ends with each of the first and second ends being positioned in a respective one of the pair of grooves such that the first and second ends enter further into the associated grooves as the friction damper is pressed towards the driving shaft by the engine lubricating oil under pressure in the respective chamber, with the relationship of each plate spring to its associated pair of grooves being such that its first and second ends contact the bottom surfaces of the pair of grooves only when said projections are worn out, and a predetermined gap is provided between said driving shaft and the plate spring when the first and second ends of the plate spring contact the bottom surfaces of the associated pair of grooves.

8. An engine accessory driving system in accordance with claim 7, wherein each of said grooves has a pin positioned therein to slidingly retain the respective end of the plate spring within that groove.

9. An engine accessory driving system in accordance with claim 8, wherein each pin is positioned parallel to the axis of said driving shaft.

10. An engine accessory driving system in accordance with claim 9, wherein the projections on each rubber member comprise a projection located at a center of the rubber member, and a pair of projections located at opposite ends of the rubber member.

11. An engine accessory driving system in accordance with claim 1, wherein said friction damper has lips on said outer surface which contact said inner wall of said housing to form said chamber.

12. An engine accessory driving system in accordance with claim 1, wherein said friction damper has a plurality of projections extending toward said driving shaft so that said projections are said portion of said inner surface of said friction damper.

13. An engine accessory driving system in accordance with claim 12, wherein said projections are spaced apart along the length of said friction damper, so that some of said projections come into contact with said driving shaft when said chamber is filled with engine lubricating oil at a first pressure and all of said projections come into contact with said driving shaft when said chamber is filled with engine lubricating oil at a predetermined pressure higher than said first pressure.

14. An engine accessory driving system in accordance with claim 1, wherein said friction damper comprises at least two friction dampers positioned in said compartment at opposed positions so as to surround the outer periphery of said part of said driving shaft, with each of said friction dampers defining a respective chamber between said outer periphery of said part of said driving shaft and said inner wall of said housing, and wherein said oil supply is adapted to provide engine lubricating oil under pressure to each chamber.

15. An engine accessory driving system in accordance with claim 1, wherein said housing is provided with a pair of grooves for the friction damper, each of said grooves having a bottom surface, wherein the friction damper has first and second ends with each of the first and second ends being positioned in a respective one of the pair of grooves such that the first and second ends enter further into the associated grooves as the friction damper is pressed towards the driving shaft by the engine lubricating oil under pressure in the chamber, with the relationship of each friction damper to its associated pair of grooves being such that its first and second ends contact the bottom surfaces of the pair of grooves only when said portion of said inner surface of said friction damper is worn out.

16. An engine accessory driving system in accordance with claim 15, wherein each of said grooves has a pin positioned therein to slidingly retain the respective end of the friction damper within that groove.

17. An engine accessory driving system in accordance with claim 16, wherein each pin is positioned parallel to the axis of said driving shaft.

18. An engine accessory driving system in accordance with claim 1, wherein said friction damper has a plurality of projections extending toward said driving shaft so that said projections are said portion of said inner surface of said friction damper, wherein said projections are spaced apart along the length of said friction damper, so that some of said projections come into contact with said driving shaft when said chamber is filled with engine lubricating oil at a first pressure and all of said projections come into contact with said driving shaft when said chamber is filled with engine lubricating oil at a predetermined pressure higher than said first pressure.

19. An engine accessory driving system in accordance with claim 18, wherein said friction damper comprises a plate spring having its length in an arcuate configuration, and a frictional rubber member covering a longitudinally central portion of said plate spring, said frictional rubber member constituting said portion of said inner surface of said friction damper; and wherein the projections on the friction damper comprise a projection located at a center of the rubber member, and a pair of projections located at opposite ends of the rubber member.

20. An engine accessory driving system in accordance with claim 19, wherein said rubber member has lips along the edges of said rubber member, whereby said lips extend toward and contact said inner wall of said housing to form said chamber.

* * * * *